United States Patent Office 3,113,938
Patented Dec. 10, 1963

3,113,938
WATER-INSOLUBLE MONOAZO-DYESTUFFS AND
PROCESS FOR THEIR MANUFACTURE
Herbert Nakaten, Bad Soden, Taunus, and Joachim
Ribka, Offenbach (Main), Germany, assignors to Farbwerke Hoechst Aktiengesellschaft vormals Meister
Lucius & Brüning, Frankfurt am Main, Germany, a
corporation of Germany
No Drawing. Filed Dec. 6, 1960, Ser. No. 73,982
Claims priority, application Germany Dec. 12, 1959
6 Claims. (Cl. 260—204)

The present invention provides new water-insoluble monoazo-dyestuffs and a process for their manufacture; especially it provides the water-insoluble monoazo-dyestuffs corresponding to the following general formula

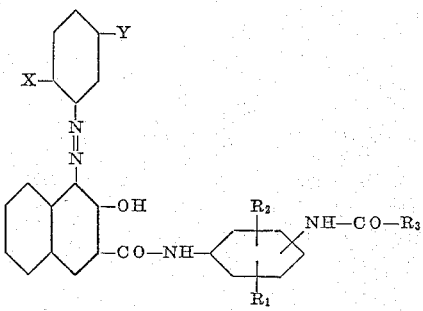

and

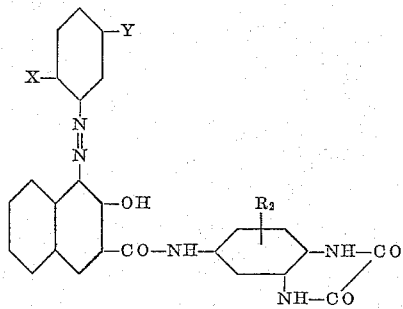

wherein X represents a halogen atom, an alkyl, alkoxy, aryloxy or carboxylic acid ester group, Y stands for a halogen atom, a trifluoromethyl, nitro, cyano, carboxylic acid ester, a carboxylic acid amide group which may be substituted, a sulfonic acid ester group, a sulfonic acid amide group which may be substituted, an alkyl sulfonic, aryl sulfonic or acyl group, $R_1$ represents a hydrogen or halogen atom, an alkyl, alkoxy or acylamino group, $R_2$ stands for a hydrogen or halogen atom, an alkyl or alkoxy group and $R_3$ stands for a hydrogen atom, an alkyl, aralkyl, aryloxyalkyl or vinyl group.

We have found that valuable water-insoluble monoazodyestuffs are obtained by coupling the diazonium compounds derived from amines corresponding to the general formula

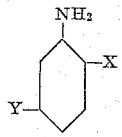

wherein X represents a halogen atom, an alkyl, alkoxy, aryloxy or carboxylic acid ester group and Y stands for a halogen atom, a trifluoromethyl, nitro, cyano, carboxylic acid ester, a carboxylic acid amide group which may be substituted, a sulfonic acid ester group, a sulfonic acid amide group which may be substituted, an alkyl-sulfonic, arylsulfonic or acyl group with 2,3-hydroxynaphthoic acid arylides having the general formula

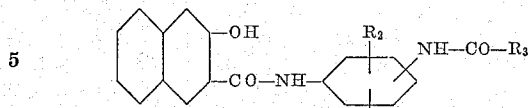

and

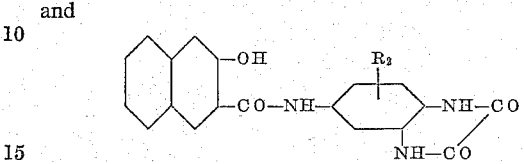

wherein $R_1$ represents a hydrogen or halogen atom, an alkyl, alkoxy or acylamino group, $R_2$ stands for a hydrogen or halogen atom, and alkyl or alkoxy group, $R_3$ stands for a hydrogen atom, an alkyl, arylalkyl, aryloxyalkyl or a vinyl group.

In the process of the present invention there may, generally, be used as coupling components, the arylides of the 2,3-hydroxynaphthoic acid which, in the arylamide radical contain at least one acylamino group with the exception, however, of the benzoylamino group. These compounds may be prepared according to known processes, for example by the condensation of 2,3-hydroxynaphthoic acid with the corresponding amino-acylaminobenzenes in an appropriate solvent, for example in toluene or pyridine, in the presence of a condensation agent, for example, phosphorus trichloride.

The prepartion of the dyestuffs is carried out according to known methods, for example by coupling, in an aqueous medium in the presence of a dispersing agent or in an organic medium, the diazotized aromatic amines with the coupling components.

The new dyestuffs are water-insoluble pigments distinguished by a good fastness to solvents. They are suitable for the preparation of colored lakes or lake formers, for the preparation of solutions or products made of acetyl-cellulose, nitro-cellulose, natural resins or artificial resins, such as polymerisation or condensation resins, for example aminoplasts or phenoplasts, as well as for the preparation of solutions or products made of polystyrene, polyolefins, such as polyethylene or polypropylene, polyacryl compounds, polyvinyl compounds, for example polyvinyl chloride or polyethylene terephthalates, rubber, casein and silicon resins.

Furthermore, these new dyestuffs are suitable for pigment printing on a substratum, especially on a textile fiber, as well as on other flat structures such as paper or plastic foils.

The dyestuffs obtained according to the process of this invention may also be used for other purposes, for example, finely dispersed in the spinning solution, for dyeing rayon made of viscose or cellulose ethers or esters, polyamides or polyurethanes or for dyeing paper.

The following examples serve to illustrate the invention but they are not intended to limit it thereto, the parts being by weight unless otherwise stated and the relationship of parts by weight to parts by volume being the same as that of the kilogram to the liter:

*Example 1*

16.2 parts of 1-amino-2,5-dichlorobenzene are stirred, for some hours with 80 parts by volume of 5 N hydrochloric acid. Then the solution is diluted with water and ice and, at 0° C., diazotized with 20 parts by volume of a 5 N sodium nitrite solution. The clarified diazo solution is then coupled, at 45° C., with an aqueous suspension of 33.5 parts of 1-(2',3'-hydroxynaphthoylamino)-4-acetylaminobenzene obtained by dissolving this compound in dilute sodium hydroxide solution and subsequently precipitating with glacial acetic acid in the presence of a reaction product from about 20 mols of ethylene oxide and 1 mol of octadecyl alcohol.

When the coupling is complete the precipitated dyestuff is filtered off, washed and dried. It represents a red powder.

The nitro-cellulose lakes prepared with this dye-stuff yield a yellowish-red lacquering having a good fastness to overspraying.

*Example 2*

17.1 parts of 1-amino-2-chlorobenzene-5-carboxylic acid-amide are dissolved in the hot in 50 parts by volume of 5 N hydrochloric acid and 175 parts by volume of water and, after the addition of ice, diazotized, at 5° C., with 20 parts by volume of a 5 N sodium nitrite solution. The diazo solution is clarified and, as described in Example 1 coupled with 33.5 parts of 1-(2',3'-hydroxynaphthoylamino)-4-acetylaminobenzene.

When the coupling is complete the precipitated dyestuff is filtered off, washed and dried.

The nitro-cellulose lakes prepared with this dye-stuff yield a yellowish-red lacquering having a good fastness to overspraying. When incorporating the dyestuff into polyvinyl chloride a yellowish-red dyeing having a good fastness to bleeding is obtained.

*Example 3*

20.7 parts of 1-amino-2-chlorobenzene-5-sulfonic acid-amide are dissolved in the hot in 60 parts by volume of 5 N hydrochloric acid and 150 parts by volume of water and, after the addition of ice, diazotized, at 0° C., with 20 parts by volume of a 5 N sodium nitrite solution. The diazo solution is clarified and, as described in Example 1, coupled with 33.5 parts of 1-(2',3'-hydroxynaphthoylamino)-4-acetylaminobenzene.

The red dyestuff obtained has a very good fastness to solvents.

*Example 4*

29 parts of 1-amino-2-methoxybenzene-5-carboxylic acid-(2'-methyl-3'-chloro)-phenylamide are diazotized in the usual manner and, as described in Example 1, coupled with 33.5 parts of 1-(2',3'-hydroxynaphthoylamino)-4-acetylaminobenzene. When the coupling is complete the precipitated dyestuff is filtered off, washed and dried. It represents a red powder.

The carmine red nitro-cellulose lacquering obtained with this dyestuff has a very good fastness to over-spraying.

In the following table there are given further dyestuffs which can be obtained by using the same coupling component as well as the tints obtained with these dyestuffs:

| Diazo component | Tint |
| --- | --- |
| 1-amino-2-chloro-5-nitrobenzene | Yellowish-red. |
| 1-amino-2-methyl-5-nitrobenzene | Do. |
| 1-amino-2-methoxy-5-nitrobenzene | Red. |
| 1-amino-2-chloro,5-trifluoromethylbenzene | Yellowish-red. |
| 1-amino-2-chlorobenzene-5-carboxylic acid-methyl ester | Do. |
| 1-amino-2-chlorobenzene-5-carboxylic acid-(2'-chloro)-phenyl ester | Do. |
| 1-amino-2-chlorobenzene-5-carboxylic acid-(4'-chloro)-phenyl ester | Red. |
| 1-amino-2-chlorobenzene-5-carboxylic acid-(2'-methyl)-phenyl ester | Yellowish-red. |
| 1-amino-2-chlorobenzene-5-carboxylic acid,phenylamide | Do. |
| 1-amino-2-chlorobenzene-5-carboxylic aicld-(2'-methyl)-phenylamide | Do. |
| 1-amino-2-chlorobenzene-5-carboxylic acid-(2',4'-dimethyl)-phenylamide | Do. |
| 1-amino-2-chlorobenzene-5-carbosylic acid-(2',5'-dichloro)-phenylamide | Do. |
| 1-amino-2-chlorobenzene-5-carboxylic acid-methylamide | Do. |
| 1-amino-2-methoxybenzene-5-carboxylic acid-methyl ester | Bluish-red. |
| 1-amino-2-methoxybenzene-5-carboxylic acid-phenyl ester | Do. |
| 1-amino-2-methoxybenzene-5-carboxylic acid-(2'-chloro)-phenyl ester. | Do. |

| Diazo component | Tint |
| --- | --- |
| 1-amino-2-methoxybenzene-5-carboxylic acid-amide | Carmine. |
| 1-amino-2-methoxybenzene-5-carboxylic acid-methylamide | Do. |
| 1-amino-2-methoxybenzene-5-carboxylic acid-phenylamide | Do. |
| 1-amino-2-methoxybenzene-5-carboxylic acid-(2',4'-dimethyl)-phenylamide. | Do. |
| 1-amino-2-methoxybenzene-5-carboxylic acid-(2'-chloro)-phenylamide. | Do. |
| 1-amino-2-methoxybenzene-5-carboxylic acid-2'-naphthylamide. | Do. |
| 1-amino-2-methylbenzene-5-carboxylic acid-methyl ester | Red. |
| 1-amino-2-methylbenzene-5-carboxylic acid-phenyl ester | Do. |
| 1-amino-2-methylbenzene-5-carboxylic acid-(2'-methyl)-phenyl ester. | Do. |
| 1-amino-2-methylbenzene-5-carboxylic acid-amide | Do. |
| 1-amino-2-methylbenzene-5-carboxylic acid-phenylamide | Do. |
| 1-amino-2-(4'-chloro-phenoxy)-benzene-5-carboxylic - acid-methyl ester. | Bluish-red. |
| 1-amino-2-(4'-chloro-phenoxy)-benzene-5-carboxylic acid-phenyl ester. | Do. |
| 1-amino-2-(4'-chloro-phenoxy)-benzene-5-carboxylic acid-amide. | Do. |
| 1-amino-2-chlorobenzene-5-sulfonic acid-(4'-chloro)-phenyl ester. | Red. |
| 1-amino-2-chlorobenzene-5-sulfonic acid-methylamide | Do. |
| 1-amino-2-chlorobenzene-5-sulfonic acid-phenylamide | Red. |
| 1-amino-2-methoxybenzene-5-sulfonic acid-phenylamide | Bluish-red. |
| 1-amino-2-methoxybenzene-5-sulfonic acid-diethyl-amide | Do. |
| 1-amino-2-methoxybenzene-5-sulfonic acid-amide | Do. |
| 1-amino-2-methylbenzene-5-sulfonic acid-dimethylamide | Red. |
| 1-amino-2-methylbenzene-5-sulfonic acid-amide | Do. |
| 1-amino-2-phenoxybenzene-5-sulfonic acid-dimethylamide | Do. |
| 1-amino-2-phenoxybenzene-5-sulfonic acid-amide | Do. |
| 1-aminobenzene-2,5-dicarboxylic acid-dimethylester | Do. |
| 1-amino-2-chloro-5-cyanobenzene | Yellowish-red. |
| 1-amino-2-chloro-5-methylsulfonylbenzene | Do. |
| 1-amino-2-chlorobenzene-5-carboxylic acid-ethylamide | Do. |
| 1-amino-2-chloro-5-acetylbenzene | Do. |
| 1-amino-2-methylbenzene-5-carboxylic acid-methylamide | Red. |
| 1-amino-5-nitrobenzene-2-carboxylic acid-methyl ester | Do. |
| 1-aminobenzene-2-carboxylic acid-methyl ester-5-carboxylic acid-amide. | Yellowish-red. |
| 1-amino-2-ethoxybenzene-5-carboxylic acid-amide | Carmine. |
| 1-amino-2-methoxybenzene-5-sulfonic acid-methylamide | Do. |
| 1-amino-2-methylbenzene-5-sulfonic acid-methylamide | Red. |

*Example 5*

17.1 parts of 1-amino-2-chlorobenzene-5-carboxylic acid-amide are dissolved in the hot with 50 parts by volume of 5 N hydrochloric acid and 175 parts by volume of water and, after the addition of ice, diazotized, at 5° C., with 20 parts by volume of 5 N sodium nitrite solution. The diazo solution is clarified and, at 50° C., coupled with an aqueous suspension of 34.5 parts of 1-(2',3' - hydroxynaphthoylamino)-2-methyl-4-acetylaminobenzene, obtained by dissolving this compound in dilute sodium hydroxide solution and subsequently precipitating with glacial acetic acid in the presence of a reaction product from about 20 mols of ethylene oxide and 1 mol of octadecyl alcohol. When the coupling is complete the precipitated dyestuff is filtered off, washed and dried. It represents a red powder.

The coupling may also be carried out in the presence of a carrier suited for preparing color lakes.

The nitro-cellulose lakes prepared with this dyestuff yield a red lacquering having a good fastness to overspraying. By incorporating the dyestuff into polyvinyl chloride a red dyeing having a good fastness to bleeding is obtained.

*Example 6*

17.1 parts of 1-amino-2-chlorobenzene-5-carboxylic acid-amide are diazotized, as described in Example 1. The diazo solution is clarified and coupled, at a temperature between 50° C. and 55° C., with an aqueous suspension of 34.5 parts of 1-(2',3'-hydroxynaphthoylamino)-4-propionylaminobenzene obtained by dissolving this solution in dilute sodium hydroxide solution and subsequently precipitating with glacial acetic acid in the presence of a reaction product from about 20 mols of ethylene oxide and 1 mol of octadecyl alcohol. When the coupling is complete the precipitated dyestuff is filtered off, washed and dried. It represents a yellowish-red powder.

By incorporating this dyestuff into polyvinyl chloride a yellowish-red dyeing having a good fastness to bleeding is obtained. The graphic printing prepared with this dyestuff yields an orange-red tint having a good fastness to solvents.

Example 7

19.4 parts of 1-aminobenzene-2-carboxylic acid-methyl ester-5-carboxylic acid-amide are stirred, for some time, with 80 parts by volume of 5 N hydrochloric acid, the paste of chlorine hydrate obtained is diluted with water, cooled with ice to 10° C. and diazotized with 20 parts by volume of 5 N sodium nitrite solution. The clarified diazo solution is entered into a filtered solution of 34.5 parts of 1-(2',3'-hydroxynaphthoylamino)-2-methyl-4-acetylaminobenzene in 1000 parts by volume of pyridine. Subsequently the solution is heated to 50° C., the dyestuff formed is filtered off, washed until the reaction is neutral and dried. A red dyestuff powder is obtained which dyes polyvinyl chloride yellowish-red tints having a very good fastness to bleeding. The nitro-cellulose lacquering and stoving lacquers prepared with this dyestuff possess a light red tint and a good fastness to overspraying.

Example 8

16.6 parts of 1-amino-2-methoxybenzene-5-carboxylic acid-amide are dissolved in 250 parts by volume of water and 60 parts by volume of 5 N hydrochloric acid, cooled with ice to 0° C. and diazotized with 20 parts by volume of 5 N sodium nitrite solution. The clarified diazo solution is entered into a filtered solution of 34.5 parts of 1-(2',3'-hydroxynaphthoylamino)-4-propionylaminobenzene in 900 parts by volume of pyridine. When the coupling is complete the solution is diluted with some water, the dyestuff formed is filtered off, washed and dried. A red powder is obtained which dyes polyvinyl chloride carmine-red tints having a good fastness to solvents.

In the following table are given further components to be used according to the invention as well as the tints of the graphic printings prepared with these dyestuffs:

| Diazo component | Coupling component | Tint |
|---|---|---|
| 1-amino-2-chlorobenzene-5-carboxylic acid-amide. | 1-(2',3'-hydroxynaphthoylamino)-4-formylaminobenzene. | Yellowish-red. |
| Do. | 1-(2',3'-hydroxynaphthoylamino)-2-chloro-4-acetyl-aminobenzene. | Orange. |
| Do. | 1-(2',3'-hydroxynaphthoylamino)-2-methoxy-4-acetyl-aminobenzene. | Brown. |
| Do. | 1-(2',3'-hydroxynaphthoylamino(-3-methoxy-4-acetyl,aminobenzene. | Red. |
| Do. | 1-(2',3'-hydroxynaphthoylamino)3-chloro-4-acetyl-aminobenzene. | Red. |
| Do. | 1-(2',3'-hydroxynaphthoylamino)-2-methyl-4-acetyl-amino-5-chlorobenzene. | Red. |
| Do. | 1-(2',3'-hydroxynaphthoylamino)-2,5-dimethyl-4-acetylaminobenzene. | Red. |
| Do. | 1-(2',3'-hydroxynaphthoylamino)-2-methyl-4-propionyl, aminobenzene. | Red. |
| Do. | 1-(2',3'-hydroxynaphthoylamino)-2-chloro-4-acetyl-amino-5-methoxybenzene. | Red. |
| Do. | 1-(2',3'-hydroxynaphthoylamino)-4-butyrylaminobenzene. | Yellowish-Red. |
| Do. | 1-(2',3'-hydroxynaphthoylamino)-2-methyl-4-butyryl-aminobenzene. | Red. |
| Do. | 1-(2',3'-hydroxynaphthoylamino)-4-phenylacetyl-aminobenzene. | Yellowish-red. |
| Do. | 1-(2',3'-hydroxynaphthoylamino)-3,4-oxalylaminobenzene. | Red. |
| 1-amino-2-chlorobenzene-5-carboxylic acid-methyl-amide. | 1-(2',3'-hydroxynaphthoylamino)-2-methyl-4-acetyl-aminobenzene. | Red. |
| 1-amino-2-chlorobenzene-5-carboxylic acid-phenyl-amide. | 1-(2',3'-hydroxynaphthoylamino)-4-propionylamino-benzene. | Red. |
| 1-amino-2-chlorobenzene-5-carboxylic acid-methyl ester. | 1-(2',3'-hydroxynaphthoylamino)-2-methyl-4-acetyl-aminobenzene. | Yellowish-red. |
| 1-amino-2-methoxybenzene-5-carboxylic acid-amide. | 1-(2',3'-hydroxynaphthoylamino)-2-methyl-4-acetyl-aminobenzene. | Carmine. |
| Do. | 1-(2',3'-hydroxynaphthoylamino)-2-methoxy-4-acetylaminobenzene. | Do. |
| Do. | 1-(2',3'-hydroxynaphthoylamino)-2-methoxy-4-acetylamino-5-chlorobenzene. | Do. |
| Do. | 1-(2',3'-hydroxynaphthoylamino) 2-chloro-4-acetyl-amino-5-methoxybenzene. | Do. |
| Do. | 1-(2',3'-hydroxynaphthoylamino)-2-methoxy-4-propionylaminobenzene. | Do. |
| Do. | 1-(2',3'-hydroxynaphthoylamino)-2-methyl-4-acetyl-amino-5-methoxybenzene. | Do. |
| Do. | 1-(2',3'-hydroxynaphthoylamino)-4-butyrylaminobenzene. | Do. |
| Do. | 1-(2',3'-hydroxynaphthoylamino)-4-phenylacetyl-aminobenzene. | Do. |
| Do. | 1-(2',3'-hydroxynaphthoylamino)-4-phenoxyacetyl-aminobenzene. | Do. |
| Do. | 1-(2',3'-hydroxynaphthoylamino)-3,4-oxalylaminobenzene. | Do. |
| 1-amino-2-methoxybenzene-5-carboxylic acid-phenylamide. | 1-(2',3'-hydroxynaphthoylamino)-3,4-bis-acetyl-aminobenzene. | Claret. |
| Do. | 1-(2',3'-hydroxynaphthoylamino)-2,4-bis-acetyl-aminobenzene. | Carmine. |
| 1-amino-2-methoxybenzene-5-carboxylic acid-methyl ester. | 1-(2',3'-hydroxynaphthoylamino)-2-methoxy-4-acetyl-aminobenzene. | Do. |
| 1-amino-2-methoxybenzene-5-carboxylic acid-methyl-amide. | do. | Do. |
| 1-amino-2-ethoxybenzene-5-carboxylic acid-amide. | 1-(2',3'-hydroxynaphthoylamino)-4-acetylamino-benzene. | Do. |
| 1-amino-2-methylbenzene-5-carboxylic acid-amide. | 1-(2',3'-hydroxynaphthoylamino)-2-methoxy-4-acetyl-aminobenzene. | Red. |
| Do. | 1-(2',3'-hydroxynaphthoylamino)-2-methoxy-4-acetyl-amino-5-chlorobenzene. | Red. |
| Do. | 1-(2',3'-hydroxynaphthoylamino)-4-propionylamino-benzene. | Red. |
| Do. | 1-(2',3'-hydroxynaphthoylamino)-4-phenylacetyl-aminobenzene. | Red. |
| Do. | 1-(2',3'-hydroxynaphthoylamino)-3,4-oxalylamino-benzene. | Bluish-red. |
| 1-aminobenzene-2,5-dicarboxylic acid-dimethyl ester. | 1-(2',3'-hydroxynaphthoylamino)-2-methyl-4-acetyl-aminobenzene. | Red. |
| Do. | 1-(2',3'-hydroxynaphthoylamino)-4-propionylamino-benzene. | Red. |
| 1-amino-2-(4'-chloro)-phenoxybenzene-5-carboxylic acid-amide. | 1-(2',3'-hydroxynaphthoylamino)-2-methyl-4-acetyl-aminobenzene. | Red. |
| 1-amino-2-(4'-chloro)-phenoxybenzene-5-carboxylic acid-methyl ester. | do. | Red. |
| 1-amino-2-chlorobenzene-5-sulfonic acid-amide. | do. | Red. |
| Do. | 1-(2',3'-hydroxynaphthoylamino)-4-propionylaminobenzene. | Yellowish-red. |
| Do. | 1-(2',3'-hydroxynaphthoylamino)-4-butyrylaminobenzene. | Do. |
| 1-amino-2-chlorobenzene-5-sulfonic acid-methylamide. | 1-(2',3'-hydroxynaphthoylamino)-4-propionylaminobenzene. | Do. |
| 1-amino-2-methoxybenzene-5-sulfonic acid-amide. | 1-(2',3'-hydroxynaphthoylamino)-2-methoxy-4-acetylaminobenzene. | Carmine. |
| Do. | 1-(2',3'-hydroxynaphthoylamino)-2-methoxy-4-acetylamino-5-chlorobenzene. | Do. |
| Do. | 1-(2',3'-hydroxynaphthoylamino)-2-methyl-4-acetylamino-5-methoxybenzene. | Do. |
| Do. | 1-(2',3'-hydroxynaphthoylamino)-4-propionylaminobenzene. | Do. |
| Do. | 1-(2',3'-hydroxynaphthoylamino)-3,4-oxalylaminobenzene. | Do. |
| 1-amino-2-methoxybenzene-5-sulfonic acid-methylamide. | 1-(2',3'-hydroxynaphthoylamino)-2-methoxy-4-acetylaminobenzene. | Do. |
| 1-amino-2-methoxybenzene-5-sulfonic acid-diethylamide. | 1-(2',3'-hydroxynaphthoylamino)-2-methoxy-4-acetylamino-5-chlorobenzene. | Do. |

| Diazo component | Coupling Component | Tint |
|---|---|---|
| 1-amino-2-methylben-zene-5-sulfonic acid-amide. | 1-(2',3'-hydroxynaph-thoylamino)-2-methyl-4-acetylaminobenzene. | Red. |
| Do | 1-(2',3'-hydroxynaph-thoylamino)-2-methoxy-4-acetylaminobenzene. | Red. |
| Do | 1-(2',3'-hydroxynaph-thoylamino)-4-propion-ylaminobenzene. | Red. |
| Do | 1-(2',3'-hydroxynaph-thoylamino)-3,4-oxalyl-aminobenzene. | Red. |

We claim:
1. The water-insoluble monoazo-dyestuffs having the following formula

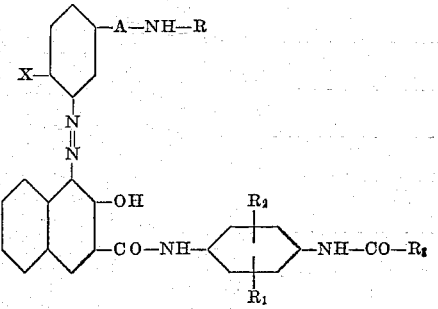

wherein X is a member selected from the group consisting of chlorine, lower alkoxy, phenoxy, chlorophenoxy and a carboxylic acid alkyl ester group, A is a member selected from the group consisting of a corbonyl and sulfonyl group, R is a member selected from the group consisting of hydrogen, lower alkyl, phenyl, methylphenyl, chlorophenyl, dimethylphenyl and dichlorophenyl, $R_1$ is a member selected from the group consisting of hydrogen, chlorine, lower alkyl, lower alkoxy and acetylamino, $R_2$ is a member selected from the group consisting of hydrogen, chlorine, lower alkyl and lower alkoxy, and $R_3$ is a member selected from the group consisting of hydrogen, lower alkyl, benzyl and phenoxymethyl.

2. The water-insoluble monoazo-dyestuff having the formula

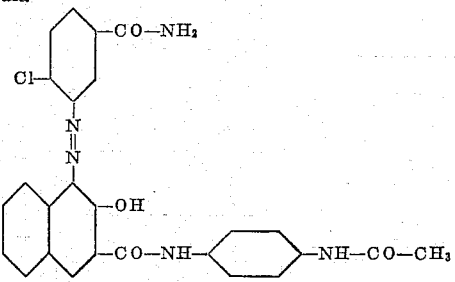

3. The water-insoluble monoazo-dyestuff having the formula

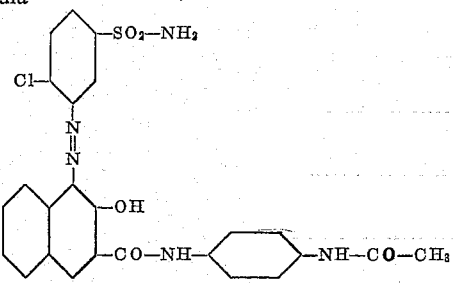

4. The water-insoluble monoazo-dystuffs having the formula

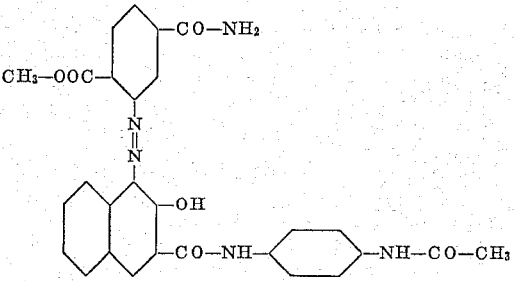

5. The water-insoluble monoazo-dyestuff having the formula

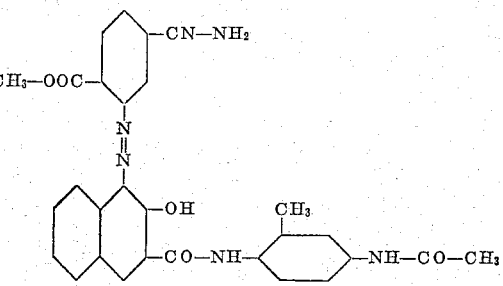

6. The water insoluble monoazo-dyestuff having the formula

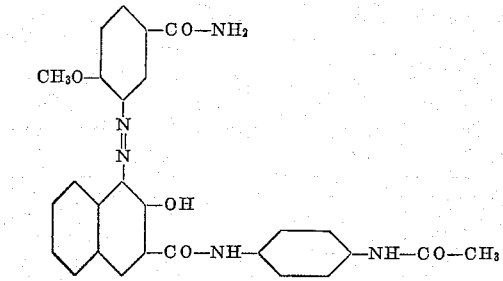

References Cited in the file of this patent
UNITED STATES PATENTS

| | | |
|---|---|---|
| 2,025,582 | Fischer | Dec. 24, 1935 |
| 2,060,163 | Bonhote | Nov. 10, 1936 |
| 2,252,844 | Fischer et al. | Aug. 19, 1941 |
| 2,262,464 | Marriott et al. | Nov. 11, 1941 |
| 2,742,459 | Fischer | Apr. 17, 1956 |
| 2,899,421 | Fischer | Aug. 11, 1959 |

FOREIGN PATENTS

| | | |
|---|---|---|
| 818,675 | France | Oct. 1, 1937 |